(12) United States Patent
Ved et al.

(10) Patent No.: US 11,693,263 B1
(45) Date of Patent: Jul. 4, 2023

(54) EYEGLASSES WITH INTERCHANGEABLE LENSES

(71) Applicant: Siya, Inc., Santa Fe Springs, CA (US)

(72) Inventors: Swati Mundhra Ved, Playa del Rey, CA (US); Sudhir Mundhra, Cerritos, CA (US); Sonal Mundhra Patel, Tustin, CA (US)

(73) Assignee: Siya, Inc., Santa Fe Springs, CA (US)

( * ) Notice: Subject to any disclaimer, the term of this patent is extended or adjusted under 35 U.S.C. 154(b) by 213 days.

(21) Appl. No.: 17/329,085

(22) Filed: May 24, 2021

Related U.S. Application Data

(60) Provisional application No. 63/029,234, filed on May 22, 2020.

(51) Int. Cl.
*G02C 7/08* (2006.01)
*G02C 1/08* (2006.01)
*G02C 9/02* (2006.01)

(52) U.S. Cl.
CPC .............. *G02C 7/088* (2013.01); *G02C 1/08* (2013.01); *G02C 9/02* (2013.01); *G02C 2200/08* (2013.01)

(58) Field of Classification Search
CPC . G02C 7/088; G02C 1/08; G02C 9/02; G02C 2200/08
USPC ....................................................... 351/41, 57
See application file for complete search history.

(56) References Cited

U.S. PATENT DOCUMENTS

| 7,316,479 | B1* | 1/2008 | Matera | G02C 1/06 351/86 |
| 7,954,942 | B2* | 6/2011 | Calilung | G02C 5/008 351/137 |
| 8,092,007 | B2* | 1/2012 | DiChiara | G02C 1/04 351/106 |
| 2016/0231588 | A1* | 8/2016 | Serge | G02C 5/2209 |
| 2016/0299359 | A1* | 10/2016 | Ogawa | G02C 1/06 |

* cited by examiner

*Primary Examiner* — Tuyen Tra
(74) *Attorney, Agent, or Firm* — Pacifica IP

(57) ABSTRACT

A pair of eyeglasses having two-part upper rim portions. One part is made of a flexible material and the other part is made of a rigid material. The flexible portion can be pulled away from the rigid part by a user, allowing a user to interchange lenses without the use of any tools.

4 Claims, 3 Drawing Sheets

101

EYEGLASSES WITH INTERCHANGEABLE LENSES

CROSS-REFERENCE TO RELATED APPLICATION

This application claims the benefit of provisional patent application No. 63/029,234, filed May 22, 2020, the disclosure of which is incorporated as if fully recited herein.

FIELD OF THE INVENTION

The present invention relates generally to a pair of eyeglasses with a partially flexible frame to allow lenses to be easily removed and inserted.

BACKGROUND OF THE INVENTION

Eyeglasses are worn to correct impaired vision. As a person's eyes change over time, the strength of the lenses or prescription may need to be changed. This is done by changing the lenses, if not the glasses, resulting in a person having numerous pairs of glasses. A person may also require a number of pairs of glasses at a given time, depending on whether the person is near-sighted, far-sighted, or both.

Glasses with interchangeable lenses can be found in the prior art, for example, in U.S. Pat. No. 6,340,226, U.S. Pat. No. 8,992,007, U.S. Pat No. 7,520,604, U.S. Pat. No. 7,370,961, U.S. Pat. No. 6,960,172, U.S. Pat. No. 6,863,395, U.S. Pat. No. 6,712,465, U.S. Pat. No. 6,132,041. However, none of these glasses offer the ease of replacing lenses of the present invention. Nor do any of these glasses hold lenses securely as many of the prior art lenses are inserted upwardly into the frame, which could allow the lens to fall if not inserted correctly. Others require the lens to be sandwiched between the lenses, risking the possibility of breaking the lens during insertion and removal. The present invention solves these problems, among others.

SUMMARY OF THE INVENTION

The present invention allows a person to have a single pair of glasses and a set of interchangeable lenses. A pair of eyeglasses in accordance with the invention has a main frame having a right rim and a left rim; a nose bridge connecting the right rim and left rim; left and right temples extending from the right and left rims; right and left rims each having an upper rim portion and a lower rim portion. The right and left lower rim portion are rigid and right and left upper rim portions each have an inner portion and an outer portion. Right and left upper rim inner portions are flexible and right and left upper outer portions are rigid, such that the right and left upper rim inner portions can be pulled away from said right and left upper outer portions so that lenses can be interchanged by a user without the use of tools. A plurality of lenses of varying prescriptions can be inserted by a user without the use of tools. These lenses are sandwiched between flexible inner portions and rigid outer portions of the upper rims of the eyeglasses.

In an alternate embodiment, the eyeglasses are sunglasses.

BRIEF DESCRIPTION OF THE DRAWINGS

A more complete understanding of the present disclosure may be obtained by reference to the detailed description when taken in conjunction with the accompanying drawings, in which like reference characters designate the same or similar parts throughout the several drawings.

DETAILED DESCRIPTION OF THE INVENTION

Figure 1:
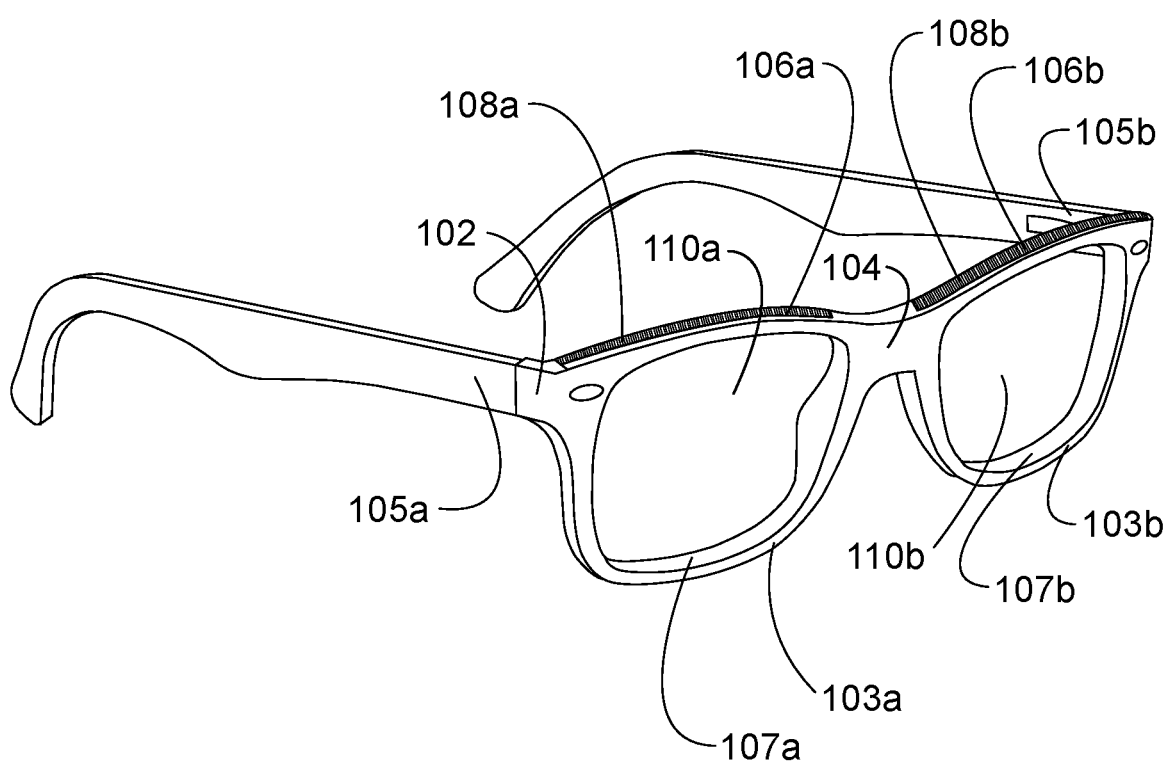
FIG. 1 is a perspective view of the glasses with the removable lenses inserted.
Figure 2:
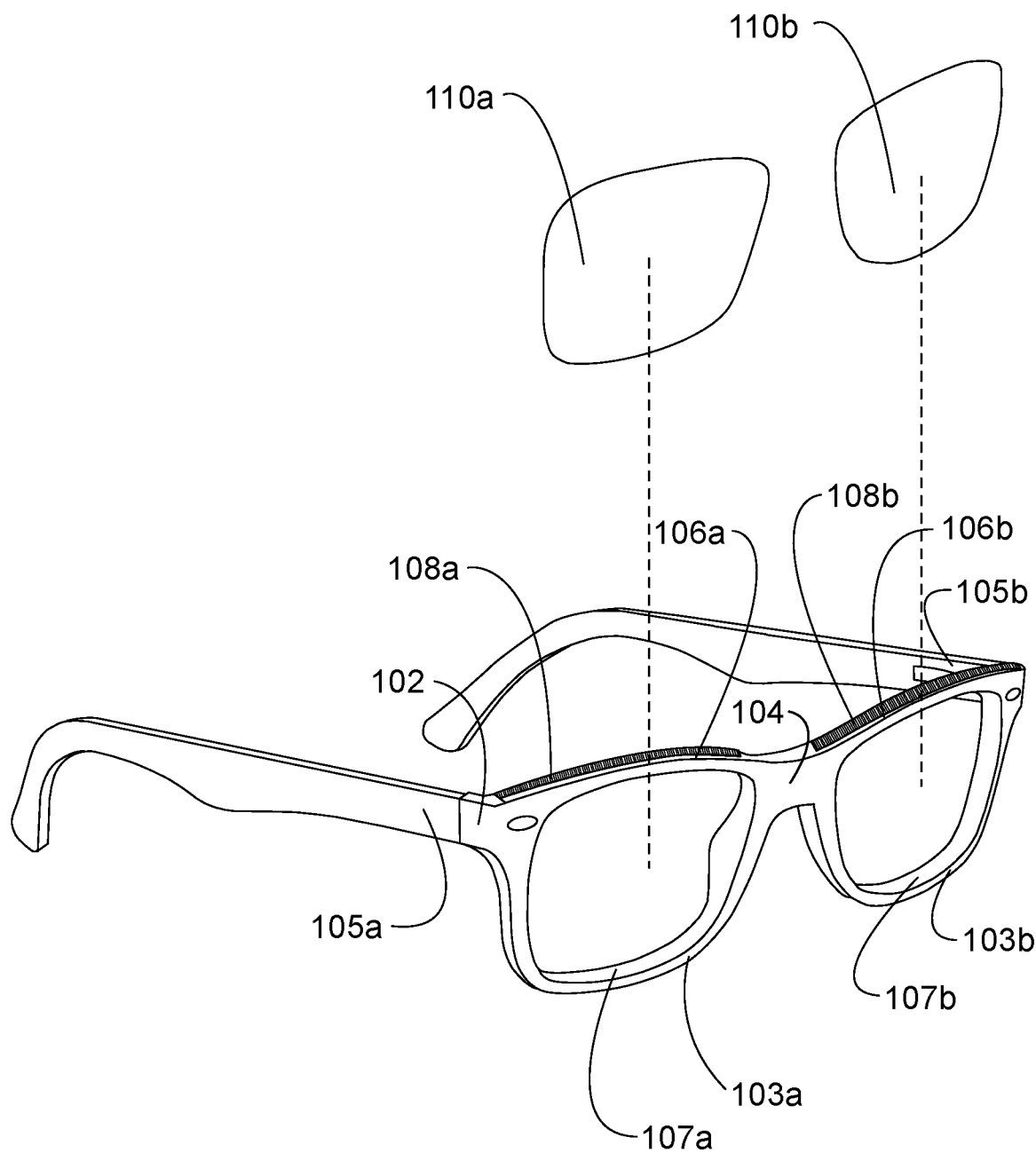
FIG. 2 is a perspective view of the glasses with the removable lenses removed.
Figure 3:
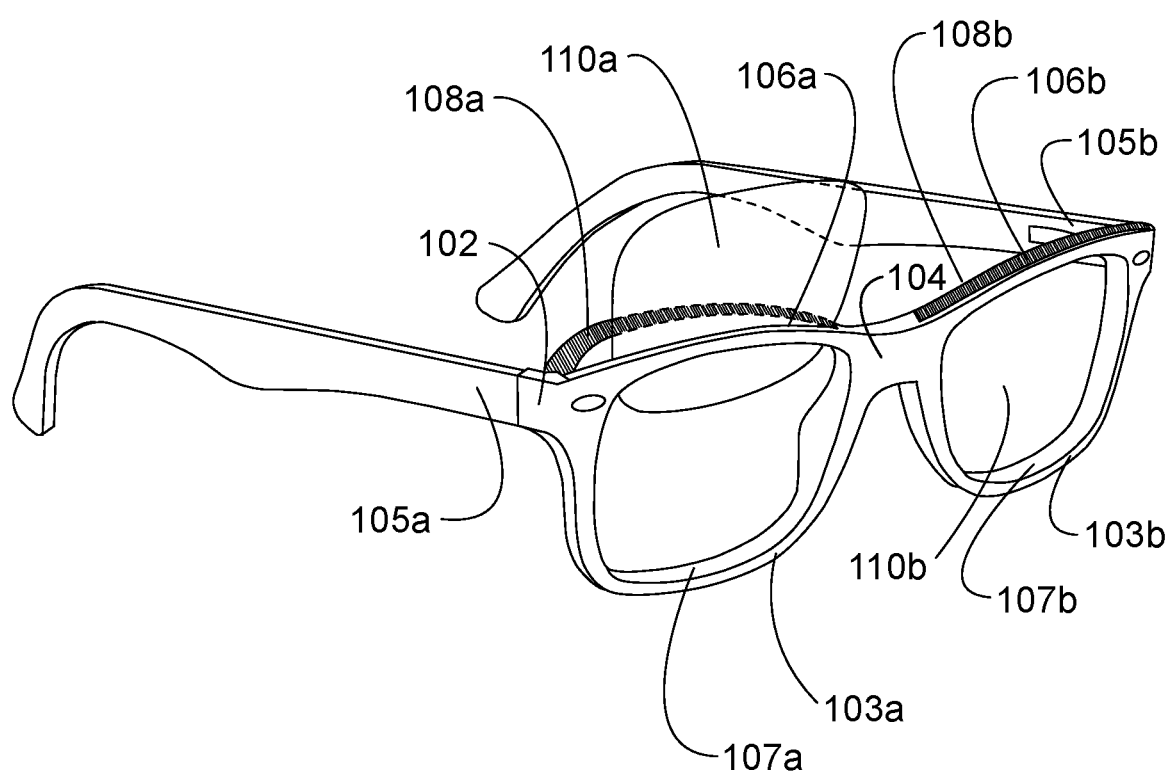
FIG. 3 is perspective view of the lens being inserted between the flexible portion and the rigid portion.

Eyeglasses 101 in accordance with the present invention have a main frame 102 and right and left rims 103a and 103b. A nose bridge 104 connects right and left rims 103a and 103b. Left and right temples 105a and 105b extend from the right and left rims 103a and 103b. Right and left rims 103a and 103b each have an upper rim portions 106a and 107a and a lower rim portions 106b and 107b. Lower rim portions 106b and 107b each have a groove (not shown) to hold a lens in the rim.

Lower rim portions 106b and 107b are rigid while each upper rim portion 106a and 107a have flexible inner portions 108a and 108b and a rigid outer portions 109a and 109b. The flexible inner portions 108a and 108b can be moved or pulled away from the rigid outer portions 109a and 109b so that lenses 110a and 110b can be interchanged by a user without the use of tools.

In use, a user can use his/her fingers to pull flexible inner portions 108a and 108b and remove a lens held in the rim. Once the lens is removed, a new lens can be inserted by pulling the flexible inner portions 108a and 108b away from the rigid outer portions 109a and 109b. Once the new lens is inserted in the frame in the groove provided in the lower rim portions 106b and 107b, flexible inner portions 108a and 108b are then released to sandwich the lens between flexible inner portions 108a and 108b and outer rigid outer portions 109a and 109b.

A set of lenses having varying prescriptions can be provided to allow for a single user to change between near-sighted and far-sighted lenses or between varying degrees of near-sighted and far-sighted lenses. Further, varying degrees of near-sighted or far-sighted lenses can be provided for multiple users to use the same pair of glasses by interchanging the lenses easily and quickly.

As these and other variations and combinations of the features discussed above can be utilized without departing from the disclosure as defined by the claims, the foregoing description of exemplary embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible aspects.

What is claimed is:

1. A pair of eyeglasses comprising:
   a main frame having a right rim and a left rim;
   a nose bridge connecting said right rim and left rim;
   left and right temples extending from said right and left rims;
   said right and left rims each having an upper rim portion and a lower rim portion;
   wherein said right and left lower rim portion are rigid and right and left upper rim portions each have an inner portion and an outer portion;

wherein said right and left upper rim inner portions are flexible and said right and left upper outer portions are rigid, such that the right and left upper rim inner portions can be pulled away from said right and left upper outer portions so that lenses can be interchanged by a user without the use of tools.

2. The pair of eyeglasses of claim 1, wherein said eyeglasses are sunglasses.

3. The pair of eyeglasses of claim 1, wherein a plurality of lenses of varying prescriptions can be inserted by a user without the use of tools.

4. The pair of eyeglasses of claim 1, wherein the lenses are sandwiched between flexible inner portions and rigid outer portions of the upper rims of the eyeglasses.

* * * * *